May 13, 1952     C. W. SCHULZE     2,596,795
FAUCET CONSTRUCTION
Filed Feb. 7, 1947
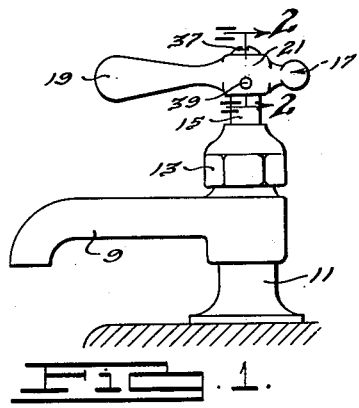
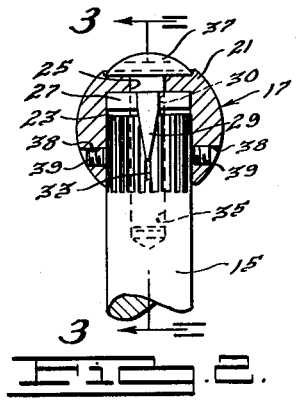
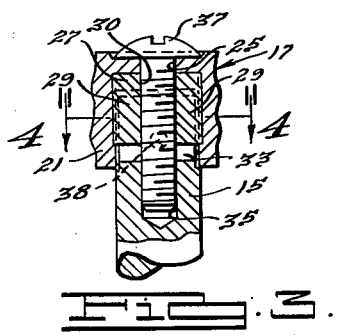
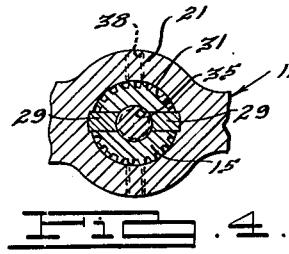
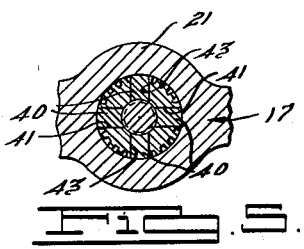
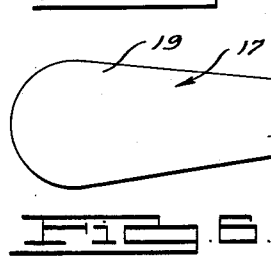
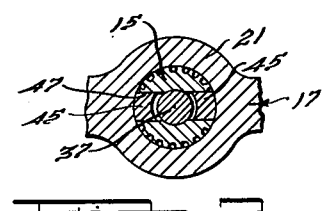
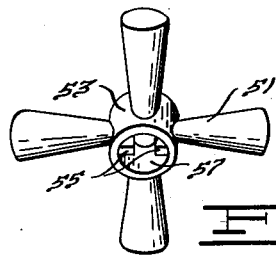
INVENTOR.
Clinton W. Schulze.
BY
Harness, Dickey & Pierce
ATTORNEYS Patented May 13, 1952

2,596,795

UNITED STATES PATENT OFFICE 2,596,795

FAUCET CONSTRUCTION

Clinton W. Schulze, Detroit, Mich.

Application February 7, 1947, Serial No. 727,074

14 Claims. (Cl. 287—53)

This invention relates generally to faucets, and more particularly to a novel faucet handle and valve stem arrangement which provides an improved operating connection therebetween.

At the present time most faucets have a cylindrically shaped valve stem, the upper end of which is splined to receive the splined bore of a handle so as to provide a driving connection therebetween. The upper end of the splined valve stem is generally provided with a tapped recess and a screw is inserted through an aperture in the top of the handle and threadably received in the tapped recess in the valve stem to lock the handle against axial movement with respect to the stem. Oftentimes this driving connection between the handle and the valve stem fails due to wearing or breaking of the splines on one or both of these parts. When this occurs, it is a difficult and expensive job to repair the faucet. Oftentimes a new valve stem must be provided for the faucet as well as a new handle.

The present invention contemplates a simple and inexpensive means for repairing faucets when the above-mentioned difficulty occurs. With the present invention the faucet can be easily repaired by the home owner or by a mechanic in a minimum amount of time, and with a minimum of new parts.

Accordingly, it is an object of this invention to permit repair of a faucet damaged in the aforementioned manner by slotting the upper end of the valve stem and positioning a faucet handle embodying the features of this invention thereon.

It is a further object of this invention to provide an improved and rigid connection between a faucet handle and faucet valve stem, which is especially rugged in construction and will withstand great shock.

It is a further object of this invention to provide an improved faucet handle which may be employed with any shaped or sized valve stem and which can be employed with such a valve stem even when the central tapped recess therein is damaged and unusable.

It is a further object of this invention to provide improved faucet handles so constructed that a single handle may be used with various sized valve stems.

It is a still further object of this invention to provide a handle of any type, such as the single arm or four arm type, which may be rigidly connected to any type valve stem in the aforementioned manner.

It is a still further object of this invention to provide an improved type faucet handle which is attractive in appearance, rugged in construction, and inexpensive to manufacture.

These and other objects of this invention will become apparent from the following detailed description taken in conjunction with the accompanying drawing in which:

Figure 1 is a perspective view of a conventional faucet with the features of this invention employed therewith;

Fig. 2 is a sectional view taken along the line 2—2 of Fig. 1;

Fig. 3 is a sectional view taken along the line 3—3 of Fig. 2;

Fig. 4 is a sectional view taken along the line 4—4 of Fig. 3;

Fig. 5 is a sectional view similar to Fig. 4 showing a further embodiment of this invention;

Fig. 6 is a view partially in section and partially in elevation illustrating a still further embodiment of this invention;

Fig. 7 is a sectional view taken along the line 7—7 of Fig. 6;

Fig. 8 is a perspective view of a still further embodiment of this invention.

Referring now to the drawing, and more particularly to Fig. 1, it will be seen that a generally conventional faucet is provided having a spout 9, a valve body 11, a metal escutcheon 13, a splined valve stem 15, and a single arm type faucet handle 17 embodying the features of this invention therein.

The faucet handle 17 illustrated in Fig. 1 is conventionally made of cast brass or white metal and includes a hand grasping portion 19 and a tubular portion 21 adjacent one end thereof, having a recess or bore 23 therein. The upper wall of the tubular portion 21 is formed with an aperture 25 therethrough which communicates with the recess 23. Cast in the handle 17 and positioned at the upper end of the recess 23 is a ring-like insert 27 made preferably of steel or the like and formed with a pair of oppositely disposed downwardly extending bosses 29 which project radially inwardly from the outer periphery of the insert and the recess 23. That is, the bosses extend downwardly from the base of the recess 23 and project radially inwardly from the peripheral wall of the recess. The bosses 29 as illustrated in Fig. 2 are tapered so that the distance between the side faces of each boss, at the lower end thereof, is less than at the upper end.

The handle 17 preferably is cast around the steel insert 27 to rigidly and permanently secure the bosses 29 within the handle recess 23 and at opposite sides thereof. Preferably as shown in Fig. 3, the bosses 29 have an outwardly projecting portion which is secured in the wall of the handle adjacent the recess 23 to more rigidly secure the bosses within the handle. It must, however, be kept in mind that the bosses 29 could be cast within the handle in any suitable manner and it is not necessary that an insert of the type shown be used. If desired, the bosses 29 could be cast separately on each side of the handle recess 23 within the adjacent handle wall.

As illustrated in Figs. 2, 3 and 4, the insert 27 is formed with a central aperture 30 of the same diameter as the aperture 25 in the handle. In order to obtain a driving connection between the valve stem 15, which is shown as being of the conventional type having splines 31 on the upper end thereof, and the handle 17, the upper end of the valve stem 15 is cut with a hack saw or the like to form a transverse shallow slot 33. The upper end of the valve stem 15 is, as previously pointed out, conventionally provided with a tapped cylindrical recess 35 adapted to threadably receive a screw 37 for securing the handle 17 to the valve stem.

In order to repair a faucet which is inoperative due to damage between the splines on the end of the valve stem and in the recess of the handle, the valve stem is cut as described to provide the transverse slot 33, and the handle 17 is then placed over the valve stem. The lower ends of the bosses 29 are fitted into the valve stem slot 33 and due to the taper of the bosses, the handle will not fit down on top of the valve stem 15. When the screw 37 is threaded into the tapped recess 35 of the valve stem and tightened it will draw the under side of the handle insert 27 down substantially against the valve stem and will cause the bosses 29 to move down into the valve stem slot 33. When this occurs, the bosses 29 will cause the valve stem, on each side of the slot 33, to spread outwardly a slight amount and will provide a fixed and rigid connection between the valve stem and the handle 17 so as to prevent any play therebetween.

The handle 17 when substantially seated on the top of the valve stem 15 will then appear identical with the original handle, which was mounted on the valve stem 15, and a rigid connection between the valve stem and the handle will be provided which cannot become easily damaged or inoperative as did the splines which were originally employed to provide the driving connection. The slot 33 in the valve stem may be cut at any desired angle or position so that the handle 17 will be mounted in the proper position for operating the particular faucet involved.

If the threads of the tapped aperture 35 in the valve stem should be damaged or unusable so that the screw 37 can not be used, the handle 17 may be provided and is shown in the drawing as provided with threaded apertures 38 on opposite sides of the tubular handle portion 21. Set screws 39 are received in these apertures and can be tightened to engage the outer periphery of the valve stem 15 to prevent axial withdrawal of the handle 17 from the valve stem. However, the handle 17 may be, if desired, made without the set screw apertures 38.

As shown in Fig. 5, the handle 17 is cast around an insert having four oppositely disposed bosses 40, which preferably are tapered in the same manner as were the bosses 29, previously described. The valve stem 15 is then cut to provide crossed slots 41 and 43 which are disposed at right angles to each other. The handle 17 is then secured to and positioned on the valve stem in the same manner as previously described, by using either the screw 37, or the set screws 39. In this way, a driving connection between the four bosses 40 and the valve stem slots 41 and 43 is provided. By employing four bosses, the hand-grasping portion of the handle can be placed in any one of four angular positions on the valve stem instead of in one of two positions, as in the previous embodiment.

As illustrated in Figs. 6 and 7, the handle 17 may be provided with bosses 45 which are not tapered as were the bosses 29, and are shown as being wider and shorter in length than the bosses 29. These bosses 45 may be, if desired, made of the same material as the handle, that is white metal or brass, because they are heavier and stronger than the tapered-type bosses 29. The valve stem 15 in order to be used with the handle of this embodiment has a comparatively wide slot 47 cut or filed in the upper end thereof.

This handle is secured and positioned on the valve stem in the same manner as that previously described. However, it will be noted that the bosses 45 will fit all the way down in the slot 47 and will not have to be forced downwardly therein as were the bosses 29, previously described. Again, if the tapped recess in the upper end of the valve stem is damaged, set screw apertures 49 may be provided for threadably receiving set screws to prevent axial withdrawal of the handle 17 from the valve stem.

The novel features of this invention may be employed on any suitable type faucet handle. Fig. 8 illustrates a handle having four arms 51 extending outwardly at right angles to each other from a central recessed hub 53. Bosses 55 of any of the aforementioned types can be cast within a central recess 57 in the central hub portion 53 in the manner previously described for the other types of handles.

It likewise should be noted that the handles of this invention could be used with any shaped valve stem and are not limited to the splined cylindrical type valve stem shown and illustrated in the drawing. Likewise, the recess 23 in the tubular portion of the handle can be made oversize so as to fit over various sized valve stems 15 so that only one handle need be made which can be used on valve stems of different sizes.

It therefore will be seen that any suitable or conventionally shaped handle may be made with any of the aforementioned bosses cast therein, and therefore any type of faucet can be quickly and easily repaired by using any of the handles of this invention.

I claim:

1. A faucet including a rotatable stem having a transversely extending slot formed in one end thereof, a faucet handle including a hand grasping portion and a tubular portion having a recess therein adapted to receive said stem, inwardly projecting bosses on opposite sides of said handle recess which project downwardly from the base of the recess and have their lower edges or crests extending at substantially right angles to the longitudinal axis of the recess, said bosses being received in said stem slot and providing a driving connection between said handle and said stem, and screw means for locking said handle against axial movement with respect to said stem.

2. A faucet including a rotatable stem having a transverse slot and a tapped axial recess in one end thereof, a faucet handle including a hand grasping portion and a tubular portion having a recess therein adapted to receive said stem, said tubular handle portion having an aperture in the upper end thereof communicating with said recess, inwardly projecting bosses on opposite sides of said handle recess which project downwardly from the base of the recess and have their lower edges or crests extending at substantially right angles to the longitudinal axis of the recess, said bosses being received in said stem slot and providing a driving connection between said handle and said stem, and screw means having the stem portion thereof passing through said handle aperture and threadably received in said tapped stem recess to lock said handle against axial movement with respect to said stem.

3. A faucet including a rotatable stem having a transverse slot in one end thereof, a faucet handle including a hand grasping portion and a tubular portion having a recess therein adapted to receive said stem, inwardly projecting bosses formed on opposite sides of said handle recess, said bosses being received in opposite sides of said stem slot to provide a driving connection between said handle and said stem, and screw means for locking said handle against axial movement with respect to said stem.

4. A faucet including a rotatable stem having a transverse slot in one end thereof, a faucet handle including a hand grasping portion and a tubular portion having a recess therein adapted to receive said stem, inwardly projecting tapered bosses formed on opposite sides of said handle recess, said tapered bosses being received in opposite sides of said stem slot to provide a driving connection between said handle and said stem, and screw means for locking said handle against axial movement with respect to said stem.

5. A faucet including a rotatable stem having a transverse slot and an axial tapped recess in one end face thereof, a faucet handle including a hand grasping portion and a tubular portion having a recess therein adapted to receive said stem, said tubular handle portion having an aperture in the upper end thereof communicating with said recess, radially inwardly projecting bosses formed on opposite sides of said handle recess and extending downwardly from the upper end thereof, said bosses being tapered so that opposite faces thereof diverge upwardly and the lower portions of the bosses are narrower than the upper portions thereof, said tapered bosses being received in opposite sides of said stem slot to provide a driving connection between said handle and said stem, and screw means having the stem portion thereof passing through said handle aperture and threadably received in said tapped stem recess to lock said handle against axial movement with respect to said stem.

6. A faucet including a rotatable stem having opposed diagonally extending slots provided in one end face thereof, a faucet handle including a hand grasping portion and a tubular portion having a recess therein adapted to receive said stem, a plurality of circumferentially spaced bosses extending radially inwardly from the wall of said handle recess said bosses being tapered so that opposite faces thereof diverge upwardly and the lower portions of said bosses are narrower than the upper portions thereof, said tapered bosses adapted to be received in the opposed slots in said stem end to provide a driving connection between said handle and said stem, and screw means for locking said handle against axial movement with respect to said stem.

7. A faucet including a rotatable stem having opposed diagonally extending slots and a tapped axial recess provided in one end thereof, a faucet handle including a hand grasping portion and a tubular portion having a recess therein adapted to receive said stem, said tubular handle portion having an aperture in the upper end thereof communicating with said recess, a plurality of circumferentially spaced bosses extending radially inwardly from the wall of said handle recess and extending downwardly from the upper end thereof said bosses being tapered so that opposite faces thereof diverge upwardly and the lower portions of the bosses are narrower than the upper portions thereof, said tapered bosses adapted to be received in the opposed slots in said stem end to provide a driving connection between said handle and said stem, and screw means having the stem portion thereof passing through said handle aperture and threadably received in said tapped stem recess to lock said handle against axial movement with respect to said stem.

8. A faucet including a rotatable stem having a tapped axial recess in one end thereof and four oppositely disposed slot portions provided adjacent the tapped recess in the end face of said stem, a faucet handle including a hand grasping portion and a tubular portion having a recess therein adapted to receive said stem, said tubular handle portion having an aperture in the upper end thereof communicating with said recess, four radially inwardly projecting bosses formed on opposite sides of said handle recess and extending downwardly from the upper end thereof said bosses being tapered so that opposite faces thereof diverge upwardly and the lower portions of the bosses are narrower than the upper portions thereof, said tapered bosses being received in said oppositely disposed slots in said stem end face to provide a driving connection between said handle and said stem, and screw means having the stem portion thereof passing through said handle aperture and threadably received in said axial recess in said stem for locking said handle against axial movement with respect to said stem.

9. A faucet handle for use in association with various sized faucet stems having a transversely extending slot formed in the upper end thereof, said faucet handle including a hand grasping portion and a tubular portion having an oversized bore therein adapted to receive any of said various sized faucet stems, inwardly projecting bosses formed on opposite sides of said handle bore which extend downwardly from the upper end thereof so as to be adapted to be received in said stem slot adjacent the outer periphery of said stem to provide a driving connection between said handle and said stem, and screw means for locking said handle against axial movement with respect to said stem.

10. A faucet handle for use in association with a faucet stem having a transversely extending slot in the upper end thereof, said faucet handle including a hand grasping portion and a tubular portion having a recess therein adapted to receive said stem, and radially inwardly projecting bosses formed on opposite sides of said handle recess which project downwardly from the base of the recess and have their lower edges or crests extending at substantially right angles to the longitudinal axis of the recess so as to be adapted to be received in said stem transverse slot to provide a positive driving connection between said handle and stem.

11. A faucet handle for use on a faucet stem having a transversely extending slot formed in the top face thereof, said faucet handle including a hand grasping portion and a tubular portion having a recess therein adapted to receive said stem, said tubular portion having a central aperture in the upper end thereof communicating with said recess of a smaller diameter than the diameter of said recess, and bosses formed on opposite sides of said handle recess which project radially inwardly by an amount such that the inner edges thereof are disposed below and in substantial alignment with the wall of said aperture, said bosses projecting downwardly from the base of the recess so as to be adapted to be received in said stem slot.

12. A faucet handle for use on a faucet stem having a transversely extending slot formed in the upper end thereof, said faucet handle including a hand grasping portion and a tubular portion having a recess therein adapted to receive said stem, and inwardly projecting longitudinally tapered bosses formed on opposite sides of said handle recess and projecting downwardly from the base of the recess, having their lower edges extending at substantially right angles to the longitudinal axis of the recess so as to be adapted to be received in opposite sides of said stem slot.

13. A faucet handle for use on a rotatable faucet stem having a slot extending transversely across the top surface slot thereof, said faucet handle including a hand grasping portion and a tubular portion having a recess therein adapted to receive said stem, said tubular portion having an aperture in the upper end thereof communicating with said recess, and bosses formed on opposite sides of said handle recess which project radially inwardly from the wall of said recess by an amount such that the inner edges of the bosses lie on the end of a diameter which is at least as great as the diameter of said aperture, said bosses extending downwardly from the upper end of said recess, said bosses being tapered so that the lower portions thereof are narrower than the upper portions thereof and are adapted to be received in opposite sides of said stem slot.

14. A faucet handle for use on a rotatable faucet stem having opposed transverse slots formed in the top face thereof, said faucet including a hand grasping portion and a tubular portion having a recess therein adapted to receive said stem, and a plurality of circumferentially spaced radially inwardly projecting bosses in the wall of said handle recess which project downwardly from the base of the recess, said bosses being tapered so that the lower portions thereof are narrower than the upper portions thereof and are adapted to be received in the opposed slots in said stem.

CLINTON W. SCHULZE.

REFERENCES CITED

The following references are of record in the file of this patent:

UNITED STATES PATENTS

| Number | Name | Date |
| --- | --- | --- |
| 1,070,451 | Griffin | Aug. 19, 1913 |
| 1,495,733 | Gillen | May 27, 1924 |
| 1,832,554 | Holstein | Nov. 17, 1931 |
| 2,047,704 | Podolsky | July 14, 1936 |
| 2,098,515 | Pardieck | Nov. 9, 1937 |
| 2,153,950 | Whinery | Apr. 11, 1939 |
| 2,171,361 | Gits et al. | Aug. 29, 1939 |
| 2,233,962 | Rover | Mar. 4, 1941 |

FOREIGN PATENTS

| Number | Country | Date |
| --- | --- | --- |
| 287,436 | Italy | July 20, 1931 |
| 587,804 | France | Apr. 29, 1940 |